US011593337B2

(12) United States Patent
Xiao

(10) Patent No.: US 11,593,337 B2
(45) Date of Patent: Feb. 28, 2023

(54) DATA PROCESSING METHOD, DEVICE, AND A STORAGE MEDIUM

(71) Applicant: BAIDU ONLINE NETWORK TECHNOLOGY (BEIJING) CO., LTD., Beijing (CN)

(72) Inventor: Wei Xiao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 229 days.

(21) Appl. No.: 17/042,066

(22) PCT Filed: Aug. 14, 2019

(86) PCT No.: PCT/CN2019/100495
§ 371 (c)(1),
(2) Date: Sep. 25, 2020

(87) PCT Pub. No.: WO2020/134115
PCT Pub. Date: Jul. 2, 2020

(65) Prior Publication Data
US 2021/0097043 A1     Apr. 1, 2021

(30) Foreign Application Priority Data

Dec. 26, 2018   (CN) .......................... 201811605446.1

(51) Int. Cl.
*G06F 16/20*     (2019.01)
*G06F 16/22*     (2019.01)
(Continued)

(52) U.S. Cl.
CPC .............. *G06F 16/22* (2019.01); *G06F 3/067* (2013.01); *G06F 16/21* (2019.01); *G06F 16/27* (2019.01)

(58) Field of Classification Search
None
See application file for complete search history.

(56) References Cited

U.S. PATENT DOCUMENTS 6,886,018 B1 * 4/2005 Boudris ................ G06F 16/258
707/999.203
9,992,022 B1   6/2018 Chapman et al.
(Continued)

FOREIGN PATENT DOCUMENTS

CN    102012944 A    4/2011
CN    103902698 A    7/2014
(Continued)

OTHER PUBLICATIONS

PCT/CN2019/100495 English translation of International Search Report dated Oct. 30, 2019, 2 pages.
(Continued)

*Primary Examiner* — Jau Shya Meng
(74) *Attorney, Agent, or Firm* — Lathrop GPM LLP

(57) ABSTRACT

A data processing method is applied to a computing device serving as a blockchain node. The method comprises: acquiring a data processing request; according to the data processing request, determining a current version identifier; according to the data processing request, determining a target key value pair used for processing data, and processing data in the value range of the target value pair; writing a newly produced target value pair into a storage space, wherein the key domain of a key value pair in the storage area stores a key identifier and a version identifier, and the version identifier in the key domain of the newly produced target key value pair is the current version identifier.

19 Claims, 8 Drawing Sheets

(51) Int. Cl.
*G06F 16/21* (2019.01)
*G06F 16/27* (2019.01)
*G06F 3/06* (2006.01)

(56) References Cited

U.S. PATENT DOCUMENTS

| | | | |
|---|---|---|---|
| 10,025,943 | B1 | 7/2018 | Multani et al. |
| 10,810,184 | B1* | 10/2020 | Schleit ............... G06F 16/2365 |
| 11,222,003 | B1* | 1/2022 | Jones ................ G06F 16/2365 |
| 2010/0088750 | A1* | 4/2010 | Okamoto ............ G06Q 10/10 726/4 |
| 2014/0172898 | A1 | 6/2014 | Aguilera et al. |
| 2018/0011852 | A1* | 1/2018 | Bennett ............. G06F 16/2228 |
| 2018/0322301 | A1 | 11/2018 | Multani et al. |

FOREIGN PATENT DOCUMENTS

| | | | |
|---|---|---|---|
| CN | 104238963 | A | 12/2014 |
| CN | 108140009 | A | 6/2018 |
| CN | 108319661 | A | 7/2018 |
| CN | 109684307 | A | 4/2019 |
| CN | 109710190 | A | 5/2019 |

OTHER PUBLICATIONS

PCT/CN2019/100495 International Search Report and Written Opinion dated Oct. 30, 2019, 7 pages.
Japanese Patent Application No. 2021-500523 Office Action dated Apr. 5, 2022, 4 pages.
Japanese Patent Application No. 2021-500523 English translation of Office Action dated Apr. 5, 2022, 4 pages.
Chinese Patent Application No. 201811605446.1 Second Office Action dated Jan. 21, 2021,9 pages.
Chinese Patent Application No. 201811605446.1 English translation of Second Office Action dated May 12, 2020, 11 pages.
PCT/CN2019/100495 English translation of the International Search Report and Written Opinion, 9 pages.
Chinese Patent Application No. 201811605446.1 First Office Action dated May 12, 2020, 8 pages.
Chinese Patent Application No. 201811605446.1 English translation of First Office Action dated May 12, 2020, 9 pages.
Japanese Patent Application No. 2021-500523 Office Action dated Nov. 8, 2022, 2 pages.
Japanese Patent Application No. 2021-500523 English translation of Office Action dated Nov. 8, 2022, 2 pages.

* cited by examiner

DATA PROCESSING METHOD, DEVICE, AND A STORAGE MEDIUM

CROSS-REFERENCE TO RELATED APPLICATIONS

The present application is national phase application of International Application No. PCT/CN2019/100495 filed on Aug. 14, 2019, which claims priority to Chinese Patent Application No. 201811605446.1, filed on Dec. 26, 2018, the entire contents of which are incorporated herein by reference.

TECHNICAL FIELD

The present disclosure relates to a field of computer data storage technologies, and more particularly, to a data processing method, a device and a storage medium.

BACKGROUND

Currently, there are many underlying data storage technologies used in the blockchain system, in which a Key Value (KV) storage system is widely used. The KV storage system supports access processing such as data reading and writing of the blockchain system under the control of upper software of the blockchain system.

In the KV storage system, many KVs are used to store various data required by the blockchain system, and some KVs may need to be modified as blocks are generated. For example, after a transaction processing request is initiated in the blockchain network, the nodes in the blockchain network are needed to execute intelligent contracts in the transaction processing request. The intelligent contracts need to be executed based on some of existing data, meanwhile some of existing data need to be modified. For example, for intelligent contracts with a money-transferring function, it is necessary to read KVs of a transfer-in account and a transfer-out account. The key in the KV stores account names, and the value in the KV stores a value field of account balances. After the intelligent contracts are executed, the respective values of the transfer-in account and the transfer-out account are modified according to the money-transferring amount. In fact, a block generation process involves a large number of KV changes.

Currently, blockchain nodes establish an index for the KV storage system to facilitate access to data. However, the index changes frequently with the varied KV, which is usually determined by the index manner adopted by the KV storage system itself. According to the data processing requirements of the upper software of the blockchain system, adjustments will be made to add KVs, delete KVs, or change KVs, so the index of KV needs to be adjusted accordingly.

When the blockchain data stored locally by some blockchain nodes need to be rolled back and redo due to bifurcations of the blockchain, the rollback operation will gradually restore the data stored in the underlying KV storage system to the bifurcations, then the redo instruction is executed in new blockchains, that is, the business logic of all the transactions is re-executed, and the generated block data is inserted into the KV storage system, which inevitably leads to excessive resource overhead.

Therefore, due to the data processing characteristics of the blockchain system, the performance of the existing KV storage system is poor when it is used to support the data storage of the blockchain nodes.

SUMMARY

The following is an overview of the subject matters described in detail herein. This summary is not intended to limit the protection scope of the claims.

The embodiments of the present disclosure provide a data processing method, a data processing apparatus, a device, and storage medium to optimize the storage mode of the KV storage system and then improve the performance of the storage system.

Embodiments of the present disclosure provide a data processing method. The method includes: acquiring a data processing request; according to the data processing request, determining a current version identifier; according to the data processing request, determining a target key value pair for processing data, and processing data in a value field of the target key value pair; and writing a newly generated target key value pair into a storage space, in which a key field of a key value pair in the storage space stores a key identifier and a version identifier, and a version identifier in a key field of the newly generated target key value pair is the current version identifier.

Another embodiment of the present disclosure provides a device. The device includes: one or more processors, and a storage device configured to store one or more programs. When the one or more programs are executed by the one or more processors, the one or more processors are caused to implement the data processing method according to any embodiment of the present disclosure.

Another embodiments of the present disclosure provide a non-transitory computer-readable storage medium on which a computer program is stored, in which the program when executed by a processor, implements the data processing method according to any embodiment of the present disclosure.

After reading and understanding the drawings and detailed description, other aspects may be understood.

DETAILED DESCRIPTION

The present disclosure will be further described in particular below in conjunction with the drawings and embodiments. It may be understood that the specific embodiments described here are only used to explain the present disclosure, but not to limit the present disclosure. In addition, it should be noted that, for ease of description, the drawings only show parts of, but not all structures related to the present disclosure.

Embodiment 1

Figure 1:
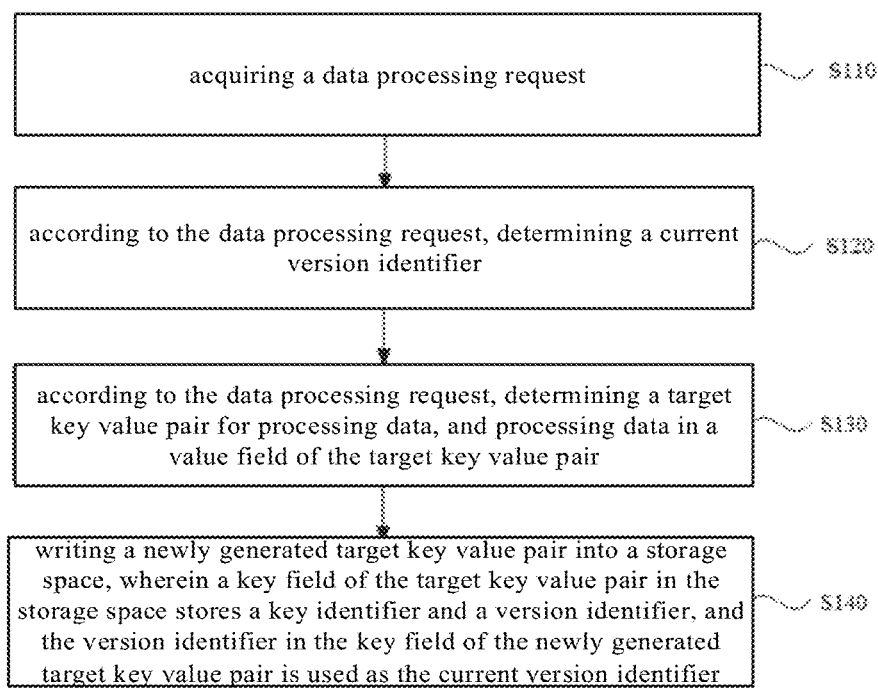
FIG. 1 is a flowchart of a data processing method provided in Embodiment 1 of the present disclosure.

FIG. 1 is a flowchart of a data processing method provided in Embodiment 1 of the present disclosure. This embodiment is applicable to the case where the KV storage system is used as an underlying storage system for processing the data transmitted by upper software. In particular, the KV storage system may better match the data processing characteristics of the blockchain system when supporting the data storage of the blockchain system. The method is executed by a data storage apparatus, which may be implemented in software and/or hardware, and may be integrated into a carrying computing device, especially a computing device served as a blockchain node. As illustrated in FIG. 1, the method specifically includes the following steps.

At step S110, a data processing request is acquired.

In this embodiment, the data processing request refers to a request for processing data. In particular, the data processing request is a request sent by the upper software to the underlying storage system, that the underlying storage system is required to perform some operation such as writing, modifying, reading, or deleting the data to be processed at any time when the data needs to be processed for example, at a specific time, or when a certain amount of data is reached, or a certain trigger mechanism is received. The embodiments of the present disclosure are particularly suitable for data processing of a blockchain system. The following embodiments take the processing of blockchain data as an example for description. However, those skilled in the art may understand that the technical solutions of the embodiments of the present disclosure are not limited to be used in a blockchain system.

Alternatively, the data processing request may include target data to be processed. The target data may be block data, transaction data or other business data or management data. The transaction data is the data processed in the blockchain system for the initiated transaction request. The block data include the data stored in the block, and the data stored locally on the blockchain node that is dependent on the blockchain but independent of the blockchain. The data processing request may also include target data identifiers, such as block identifiers or transaction identifiers. The block identifier refers to a sign used to uniquely identify a block, such as block ID. The transaction identifier refers to a sign used to uniquely identify a certain type of transaction data or a certain transaction data.

At step S120, according to the data processing request, a current version identifier is determined.

In this embodiment, the version identifier is the one that serves as a unique identifier, and is used to identify an update operation of the data involved in the current data processing request.

The current version identifier refers to the version identifier used by the data to be processed in the data processing request. There may be one or more data processing requests. A version identifier may be applicable to the data involved in a data processing request, and may also be applicable to the data involved in a batch of data processing requests. In particular, the data processing requests generated in different blocks may have different version identifiers, that is, the data involved in the data processing requests generated during the processing in the same block have a same version identifier. Alternatively, the data involved in the data processing requests generated during the processing on a transaction data has a version identifier. There may be a lot of data involved in the processing of block data or transaction data. For example, when the transaction request data needs to be stored, the transaction request data is the data involved in the writing request. when an account balance of an account has changed due to the execution of an intelligent contract in a transaction request, the account balance is the data involved in the writing request.

The version identifier may be randomly generated or generated according to preset rules, which may be for example serial number, or serial number+block identifier/transaction identifier. In order to facilitate subsequent operations such as query and modification, in this embodiment, it is preferable to generate the version identifier according to the preset rules. The preset rules are, for example, that the version identifier is an integer value, and a new version identifier is determined to be adding one to the previous version identifier. Alternatively, the data processing request may also include the previous version identifier. Therefore, the previous version identifier may be extracted from the data processing request, and then the current version identifier is generated according to the previous version identifier.

At step S130, according to the data processing request, a target key value pair for processing data is determined, and data in a value field of the target key value pair is processed.

In this embodiment, the key field of the key value pair is used to store a key identifier and a version identifier of the data, wherein the key identifier may be an identifier that reflects the actual meaning of the data, such as a block identifier or a transaction identifier. The value field of the key value pair is used to store the data itself. The target key value pair is used to store the target data of the data processing request and support data processing, which may be an existing key value pair where the target data in the data processing request is located, or a newly generated key value pair.

When the data processing request is a reading operation on target data, the existing key value pair where the target data in the data processing request is located is the target key value pair. For example, determining the target key value pair for processing data according to the data processing request may include: according to the key identifier and the version identifier of the target data in the data processing request, determining an existing key value pair where the target data is located as the target key value pair. In this embodiment, the version identifier refers to a version identifier of the data to be read, which may be a previous version identifier, or any historical version identifier. In particular, the key identifier and the version identifier of the target data may be used as an index for querying in the existing key value pairs and the matched existing key value pair is used as the target key value pair.

When the data processing request is a writing operation on the target data, or a changing or deleting operation of a value field of the existing key value pair, the newly generated key value pair may be used as the target key value pair. It should be noted that in this embodiment, the operation is performed in the newly generated key value pair when it is necessary to write, change and delete the data, and the existing key value pair is retained. In this way, when it is necessary to switch to the keys of other previous versions for viewing the data, there is no need to perform data recovery of a large number of key value pairs, and the switching speed is fast. Therefore, when data needs to be deleted or changed, it is also necessary to determine the existing key value pair where the target data is located based on the key identifier and the version identifier of the target data in the data processing request, and the target data is then deleted or changed based on the existing key value pair and the target key value pair.

Generally, the upper software may determine the target data that needs to be accessed and processed, thus the information of the corresponding key identifier and version identifier may be transferred through the data processing request.

In particular, after the current version identifier is determined according to the data processing request, the target key value pair used to process the data may be determined according to the data processing request, and then according to the processing mode of the data given by the data processing request, the data in the value field of the target key value pair is processed.

Alternatively, as the data processing methods (such as changing, querying, writing, or deleting) of the data processing request are different, the data processing strategies will be different. The following embodiments will introduce in particular the processing strategies corresponding to different processing methods.

At step S140, the newly generated target key value pair is written into a storage space, in which a key field of the target key value pair in the storage space stores a key identifier and a version identifier, and the version identifier in the key field of the newly generated target key value pair is the current version identifier.

In this embodiment, the storage space refers to the storage medium required for storing the target key value pair, which may be any large-capacity storage device, such as internal storage space or disk storage space. Since the data saved after the disk is powered off will not be lost and permanently stored without being cleared, and the upper software needs the underlying storage system to permanently store the block data or transaction data, so the preferred storage space in this embodiment is a disk storage. In order to facilitate the management and subsequent queries of key value pairs, the key-value pair corresponding to the data in one block, or the associated key value pairs may be associatively stored. Alternatively, the index of the KV storage system used by the disk storage space may be an ordered table or an index tree. The ordered table is an orderly arrangement of key value pairs in an ascending or descending manner. The index tree is an arrangement of key value pairs in a tree structure, which may be a binary index tree, where the key identifiers of the key value pairs located on the right side of the index tree are greater than those of the key value pairs located on the left side of the index tree. The technical solution provided in the embodiments of this application determines the current version identifier and the target key value pair for processing data according to a data processing request, and performs operations for example, writing, changing, deleting or reading the data in a value field of the target key value pair. When the target key value pair is the newly generated target key value pair, the current version identifier is stored in a key field of the target key value pair, then the newly generated target key value pair is written into a storage space, thereby completing the data storage. In this solution, the existing key value pairs are retained, and operations are performed in the newly generated key value pairs when it is necessary to write, change and delete the data, which is convenient for data view by quickly switching to the keys of other previous version identifiers based on the version identifiers. In particular, since there are requirements for block rollback and redo in the blockchain system, for example, the rollback is required when bifurcation occurs, the KV storage system provided in the embodiments of this application easily switches to any previous version of the key value pair data, without data recovery of a large number of key value pairs. Compared with the data storage method of the existing blockchain, the version recovery speed is improved, and a new idea is provided for the data storage of the blockchain.

Embodiment 2

Figure 2:
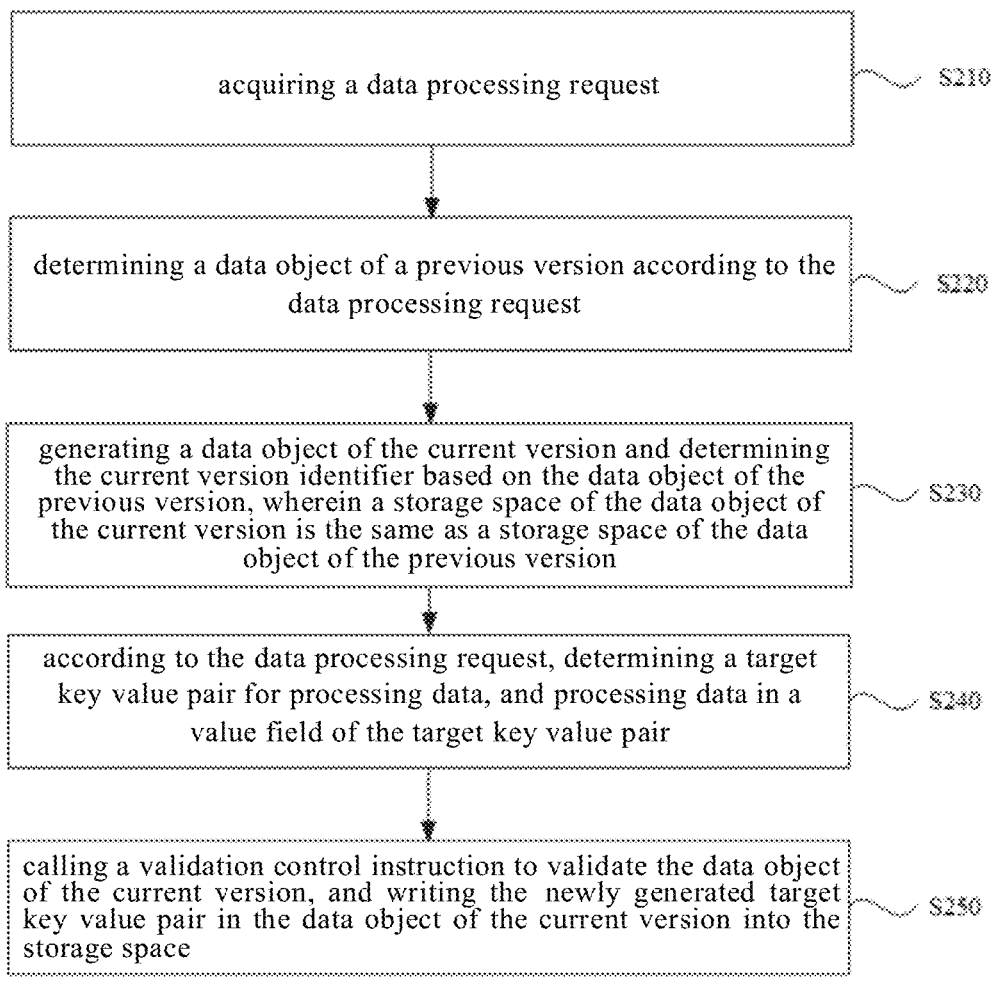
FIG. 2 is a flowchart of a data processing method provided in Embodiment 2 of the present disclosure.

FIG. 2 is a flowchart of a data processing method provided in Embodiment 2 of the present disclosure. On the basis of the foregoing embodiment, this embodiment provides a specific solution executed based on data objects. As illustrated in FIG. 2, the method specifically includes the following steps.

At step S210, a data processing request is acquired.

At step S220, a data object of a previous version is determined according to the data processing request.

In this embodiment, the data object may also be called a handle or a pointer, which may be a virtual identifier used by the underlying storage system to process one data processing request or a batch of data processing requests. The virtual identifier is configured to facilitate the usage of hardware resources of a computer device and virtual resources constructed by software during the execution of program. That is, the virtual identifier may be used to correspond to the storage resources, indicating that this data object needs to use a certain storage system and specific storage space. In particular, the main program of some data object may call a function corresponding to process the data in the data processing request during its running process. The storage system for the main program of the data object is the same as the storage system for the function of the data object.

In the embodiments of the present disclosure, one data object corresponds to one version identifier, and different version identifiers correspond to different version of data objects. Alternatively, in this embodiment, the name of the data object may include a version identifier. The data object of the previous version is the data object of an old version required to generate a data object of the current version, which is determined by upper software. In fact, the upper software may determine the version identifier of the previous version. The storage system corresponding to the data object of each version in the embodiments of the present application is a storage system of all key value pairs, which include the key value pairs of each version.

At step S230, a data object of the current version is generated and the current version identifier is determined based on the data object of the previous version, in which a storage space where the data object of the current version is operated is to the same as a storage space where the data object of the previous version is operated.

In particular, the name of data object of the previous version, such as the previous version identifier, is used as an input parameter of the main program of the data object. For example, the version generation function generates the current version identifier based on the previous version identifier, and further generates the data object of the previous version. For example, if the version generation function is tree.version( ) the name of the data object of the previous version is the previous version identifier (i.e., old_version), and ctx is the name of the data object of the current version, that is, the current version identifier may be expressed as: ctx=tree.version (old_version).

Alternatively, when the data processing request is a data processing request involved in the generation process of the current block, when the current version identifier is generated, the previous version identifier may be the version identifier of the previous block. When the data processing request is a data processing request involved in the generation process of the current transaction data, when the current version identifier is generated for the data processing request, the previous version identifier may be the version identifier of the previous transaction data.

Alternatively, different data objects are operated in the same storage space, but when different data objects call the same performance function, the parameters transmitted to the function are different. Alternatively, the parameters transmitted to the function should include the version identifier which is the current version identifier corresponding to the data object, the target data and the target data identifier. For example, when the data processing request is a writing operation on the target data, the data object of the current version may call ctx.insert function (the target data, the target data identifier, and new_version). The new_version is the parameter transmitted by the data object of the current version when calling the ctx.insert( ) function, and is the current version identifier corresponding to the data object of the current version.

In addition, different data objects are operated in the same storage space, when the data object of the current version is generated based on the data object of the previous version, a version identifier may be maintained by default without the transmission of the version identifier of the data object of the previous version.

At step S240, according to the data processing request, a target key value pair for processing data is determined, and data in a value field of the target key value pair is processed.

In particular, after the current version identifier is determined according to the data processing request, the target key value pair for processing data may be determined according to the data processing request, and then the corresponding function is called according to the data processing request to process the target key value pair.

For example, determining the target key value pair for processing data according to the data processing request, and processing the data in the value field of the target key value pair may also include: in the data object of the current version, calling a function corresponding to a data operation according to the data processing request, and determining the current version identifier of the data object of the current version as an input parameter of the function to execute the data processing request.

In particular, when the data processing request is a querying or reading operation on the target data, after determining the data object of the previous or any historical version, the existing key value pair where the target data is located in the data processing request may be determined as the target key value pair. The querying function is then called based on the data object of the previous or any historical version, the key field (key identifier and the previous or any historical version identifier) in the target key value pair is determined as input parameter of the querying function, and the querying function is executed to read and feedback the target data from the value field of the target key value pair.

When the data processing request is a writing operation on target data, the newly generated key value pair may be determined as the target key value pair. Then the data object of the current version is used to call an inserting function, and the target data, the target data identifier, and the current version identifier are determined as input parameters of the inserting function. The inserting function is executed, so that the key field of the target key value pair stores the target data identifier (which is used as key identifier) and the current version identifier, and the value field of the target key value pair stores the target data.

When the data processing request is a changing operation to change the value field of an existing key value pair, the newly generated key value pair may be determined as the target key value pair. Then the data object of the current version is used to call a changing function, and the target data, the key field (the key identifier and the previous version identifier) in the existing key value pair, and the current version identifier are determined as input parameters of the changing function, and the changing function is executed, so that the key field of the target key value pair stores the key identifier of the existing key value pair and the current version identifier, and the value field of the target key value pair stores the target data.

When the data processing request is a deleting operation on the value field of an existing key value pair, the newly generated key value pair may be determined as the target key value pair. Then the data object of the current version is used to call a deleting function, and the target data, the key field (the key identifier and the previous version identifier) in the existing key value pair, and the current version identifier are determined as input parameters of the deleting function, and the deleting function is executed, so that the key field of the target key value pair stores the key identifier of the existing key value pair and the current version identifier, and the value field of the target key value pair is set to as a null.

At step S250, a validation control instruction to validate the data object of the current version is called, and the newly generated target key value pair in the data object of the current version is written into the storage space.

The key field of the key value pair in the storage space stores the key identifier and the version identifier, and the version identifier in the key field of the newly generated target key value pair is the current version identifier.

The validation control instruction is used to control the validation of the data object of the current version, that is, to control the validation of all the data processing requests processed by the data object of the current version, and then to validate the target key value pair generated based on the current version identifier. The processing on the data processing requests based on the data object may be set according to the actual cached storage container. For example, such processing may be completed in the cache, and the updated key value pairs of the data processing requests after the validation is confirmed may be uniformly stored in the permanent storage space. The new key value pairs are copied from the memory to the disk space. If the new key value pair has already been in the cache space of the disk, the new key value pairs might be controlled and validated to be stored permanently.

Alternatively, the underlying storage system may automatically call the validation control instruction over a preset period of time after performing step S240, or call the validation control instruction after receiving some triggering operation. For example, calling the validation control instruction may include: when a current version validation condition is generated or a current version validation instruction sent by the upper software is received, calling the validation control instruction.

The current version validation condition refers to the condition that must be met for the validation of current version, which may be when the upper software transmits a new data processing request to the underlying storage system, or the waiting time meets the condition for automatic validation. Alternatively, the generated current version validation condition includes at least one of the following: 1) a block identifier of a data to be processed has changed; 2) a transaction identifier of a data to be processed has changed; and 3) the current time meets a time interval for validation. In this embodiment, the current version validation instruction refers to an instruction transmitted by the upper software, indicating that the data object of the current version is validated, which may include the current version identifier, or the data identifier in the data processing request, such as the block identifier or the transaction identifier.

In particular, when the underlying storage system receives a new data processing request transmitted by the upper software, which may be determined that the block identifier or transaction identifier of the data to be processed has changed and indicated that the previous block or transaction data has been processed, then the validation control instruction is called; or a time interval between a time stamp when the current data processing request is executed and a current time stamp is greater than or equal to the validation time interval, then the validation control instruction may be automatically called; or when the underlying storage system receives the current version validation instruction sent by the upper software, then the validation control instruction may be called. The data object of the current version is controlled to be validated, and the newly generated target key value pair in the data object of the current version is written into a permanent storage space.

It should be noted that, in this embodiment, the permission of key value pairs or data written to the storage space is limited based on the validation control instruction, which is more conducive to the management and control of the storage space.

When the underlying storage system does not call the validation control instruction, if the version identifier modification instruction sent by the upper software is received, the current version identifier may be modified according to the version identifier modification instruction, and the current version identifier in the key field of the key value pair in the data object of the current version is simultaneously updated, then the data object of the current version is controlled to be validated. For example, before the data object of the current version is controlled to be validated, the method further includes: modifying the current version identifier according to the version identifier modification instruction transmitted by the upper software, and updating the current version identifier in the key field of the key value pair.

In this embodiment, the version identifier modification instruction refers to an instruction transmitted by the upper software for modifying the version identifier in the key field of the newly generated key value pair of the data object of the current version. The version identifier may generally include a serial number and other identifiers with logical meanings as additional version identifier, such as a block identifier and a transaction identifier, or a time identifier. Preferably, the upper software may modify these additional version identifiers.

In particular, the version identifier modification instruction may include the current version identifier, the block identifier or transaction identifier before modification, the modified block identifier or transaction identifier; or the version identifier modification instruction may also include the modified version identifier. Alternatively, the version identifier modification instruction is used to modify the block identifier or transaction identifier that constitute the version identifier.

In particular, when the upper software confirms that the target data identifier included in the data processing request transmitted to the underlying storage system, such as the block identifier, is incorrect, a version identifier modification instruction including the block identifier before modification and the modified block identification is transmitted to the underlying storage system. After receiving the version modification instruction, the underlying storage system replaces the block identifier before modification with the modified block identifier according to the indication of the version modification instruction, and then the modification of the current version identifier is completed. The current version identifier in the key field of the key value pair in the data object of the current version is updated simultaneously. When the modification of key value pair based on the current version identifier and the operation on data processing request based on the data object are completed, the validation control instruction is called to control the validation of the data object of the current version.

For example, before writing the newly generated target key value pair into the storage space, the method may further include: calling a validation control instruction for controlling the validation of the data object of the current version. In this embodiment, the invalidation control instruction corresponds to the validation control instruction, for use of controlling the invalidation of the data object of the current version, that is, controlling the invalidation of the current version identifier corresponding to the data object of the current version, then the target key value pair generated based on the current version identifier is invalidated. Alternatively, before the underlying storage system writes the newly generated target key value pair into the permanent storage space, if the local device is down or power down, the invalidation control instruction is automatically called; or the invalidation control instruction may be called when a trigger operation is received. The invalidation control instruction may invalidate the new key value pair in the memory, or delete the new key value pair in the disk space as a cache. For example, calling the invalidation control instruction may include: when a current version validation condition is generated or a current version validation instruction sent by the upper software is received, calling the validation control instruction.

The current version invalidation condition refers to the condition that must be met to determine the invalidation of the current version, which may be that the local device is down, or power down, or attacked by external factors, leading to the uncompleted process on the newly generated target key value pair. The current version invalidation instruction refers to an instruction sent by the upper software to indicate that the data object of the current version is invalid, which may include the current version identifier, or the data identifier in the data processing request, such as the block identifier or the transaction identifier.

In particular, when the underlying storage system receives the current version invalidation instruction sent by the upper software, or when the local device is down or power off, the invalidation control instruction is called to control the invalidation of the data object of the current version, and then the newly generated target key value in the data object of the current version is invalid, so that the updated key value pairs in the cache may be directly discarded. In other words, if the underlying storage system calls the invalidation control instruction before the newly generated target key value pair is written into the permanent storage space, the operation on this data processing request is ended, and the failure information on this data processing request is fed back to the upper software. Permanent storage space is usually a disk.

The technical solution according to the embodiments of the present disclosure provides a solution for determining the current version identifier based on the data object of the current version after acquiring the data processing request. After determining the current version identifier, the target key value pair for processing data is determined according to the data processing request, the processes such as writing, changing, deleting or reading the data in the key field of the target key value pair are performed, and when the target key value pair is the newly generated target key value pair, the current version identifier is stored in the key field of the target key value pair. The validation control instruction is then used to invalidate the data object of the current version, and the newly generated target key value pair in the data object of the current version is written into the storage space. In this solution, when data needs to be written, changed, or deleted, the existing key value pairs are retained, and operations are performed in the newly generated key value pairs, which is convenient for data view by quickly switching to the keys of other previous version identifiers based on the version identifiers. In particular, since the blockchain system has the requirements for block rollback and redo, for example, the rollback is required when bifurcation occurs, the KV storage system according to the embodiments of this application may easily switch to the key value pair data of any previous version without the data recovery of a large number of key value pairs and optimize the indexing manner of the blockchain KV storage system. Compared with the data storage method of the existing blockchain, a new idea for the data storage of the blockchain is provided. In addition, the permission of key value pairs or data written into the storage space is limited based on the validation control instruction, which is more conducive to the management and control of the storage space.

Embodiment 3

Figure 3:
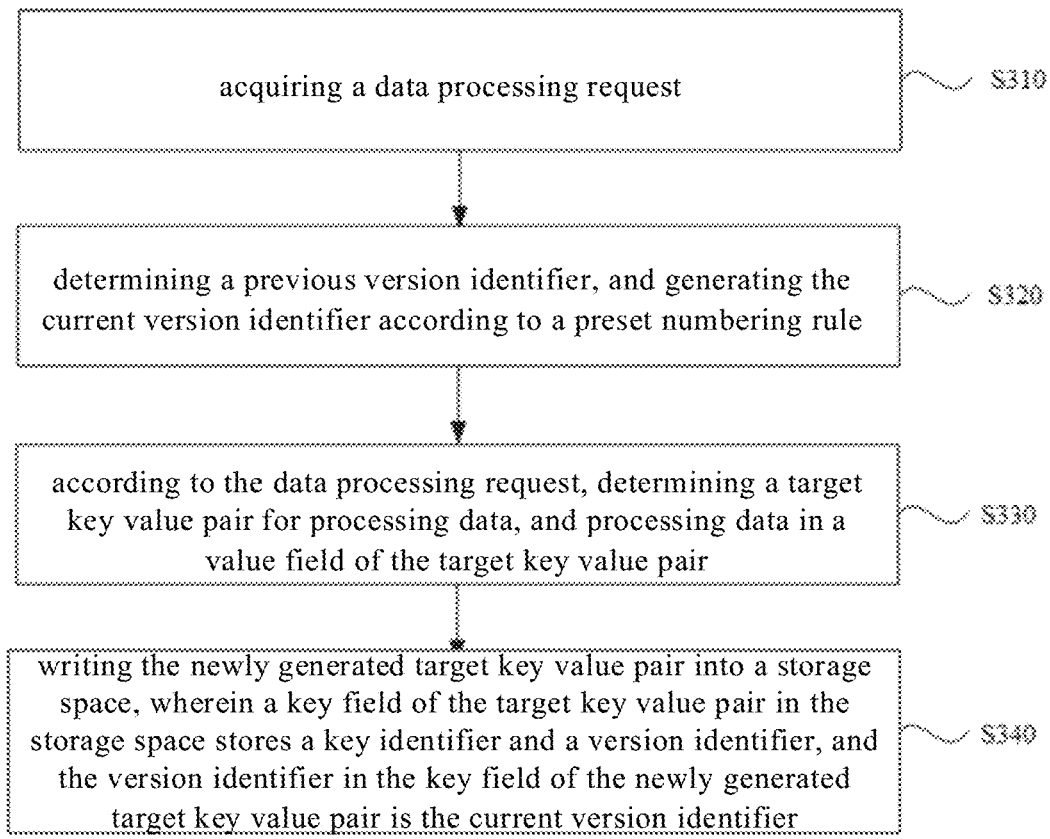
FIG. 3 is a flowchart of a data processing method provided in Embodiment 3 of the present disclosure.

FIG. 3 is a flowchart of a data processing method provided in Embodiment 3 of the present disclosure. On the basis of the foregoing embodiments, this embodiment provides a solution for determining the current version identifier according to a data processing request. As illustrated in FIG. 3, the method specifically includes the following steps.

At step S310, a data processing request is acquired.

At step S320, a previous version identifier is determined, and the current version identifier is generated according to a preset numbering rule.

Alternatively, the specific operation of S320 may also be: determining a previous version identifier, generating a serial number identifier of the current version identifier based on the serial number identifier of the previous version identifier according to the preset numbering rule, and forming the current version identifier by combining a additional version identifier determined according to the data processing request with the serial number identifier.

In this embodiment, the serial number identifier is a serial number value. The preset numbering rule refers to a predetermined rule for determining the version identifier serial number or a serial number identifier. Alternatively, the preset numbering rule may be that the number of the previous block or the number of transaction data is added or subtracted by 1 as the number value or serial number identifier. Since the target data in the data processing request may be the block data or transaction data, and the target data in one data processing request corresponds to one version identifier, thus the current version identifier may be acquired by adding a preset integer value (such as 1) to the previous version identifier or subtracting the preset integer value from the same. The serial number identifier in the current version identifier may be acquired by adding 1 to the serial number identifier of the previous version identifier or subtracting 1 from the same. For example, the additional version identifier is a block identifier or a transaction identifier.

The previous version identifier is the old version identifier required to generate the current version identifier, and may be the name of the previous version data object. The data processing request may include the target data to be processed, the target data identifier, and the previous version identifier. Therefore, the previous version identifier may be obtained from the data processing request. For example, determining the previous version identifier may include: extracting the previous version identifier from the data processing request; or determining the previous version identifier according to a business data identifier in the data processing request.

The business data is the target data to be processed, and the business data identifier is a block identifier or a transaction identifier. In particular, the previous version identifier may be obtained directly from the data processing request. The block identifier or transaction identifier of the previous version may be also determined as the additional version identifier according to the business data identifier (i.e., the target data identifier) in the data processing request, and the number of the current block or transaction data may be determined according to the target data and be then subtracted or added by 1 to obtain the previous version identifier serial number. Next, the previous version identifier is determined based on the additional version identifier and the serial number identifier.

In particular, after the previous version identifier is determined, the current version identifier may be generated based on the previous version identifier and the preset numbering rule; or the serial number identifier of the current version identifier may be also generated based on the serial number identifier of the previous version identifier and the preset numbering rule, and the target data identifier is extracted from the data processing request as the additional version identifier, the serial number identifier and the additional version identifier are used as the current version identifier.

At step S330, according to the data processing request, a target key value pair for processing data is determined, and data in a value field of the target key value pair is processed.

At step S340, the newly generated target key value pair is written into a storage space, in which a key field of the target key value pair in the storage space stores a key identifier and a version identifier, and the version identifier in the key field of the newly generated target key value pair is the current version identifier.

The technical solution according to the embodiments of the present disclosure provides a solution for determining the current version identifier based on the preset numbering rule after acquiring the data processing request, which increases the flexibility of the solution. After the current version identifier is determined, according to the data processing request, the target key value pair for processing the data is determined, the processes such as writing, changing, deleting or reading the data in the value field of the target key value pair are performed, and when the target key value pair is the newly generated target key value pair, the current version identifier is stored in the key field of the target key value pair, then the newly generated target key value pair is written into the storage space to complete the data storage. In this solution, when data needs to be written, changed, or deleted, the existing key value pairs are retained, and operations are performed in the newly generated key value pairs, which is convenient for data view by quickly switching to the keys of other previous version identifiers based on the version identifiers. In particular, since the blockchain system has the requirements for block rollback and redo, for example, the rollback is required when bifurcation occurs, the KV storage system according to the embodiments of this application may easily switch to the key value pair data of any previous version without the data recovery of a large number of key value pairs and optimize the indexing manner of the blockchain KV storage system. Compared with the data storage method of the existing blockchain, a new idea for the data storage of the blockchain is provided.

Embodiment 4

Figure 4:
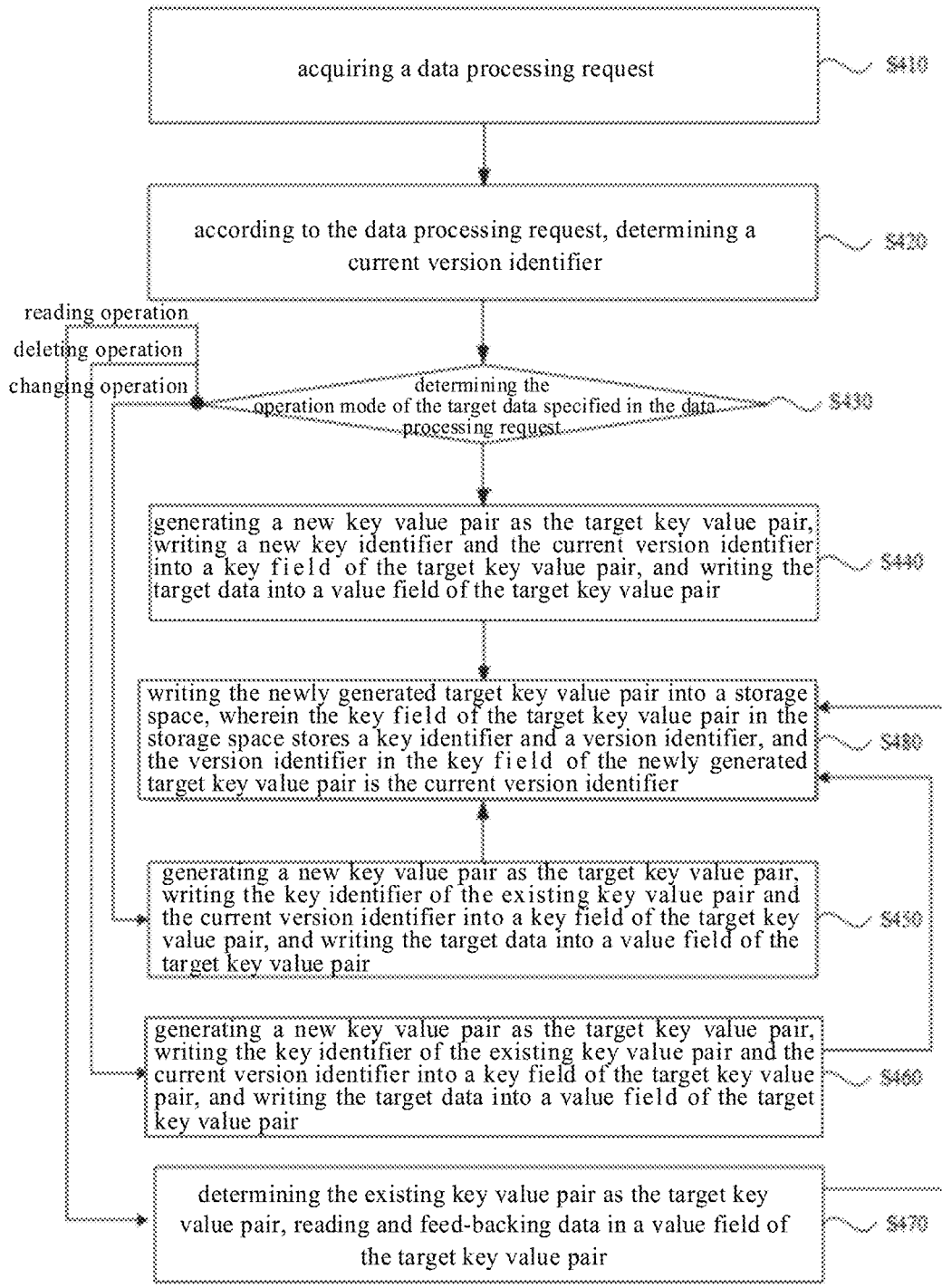
FIG. 4 is a flowchart of a data processing method provided in Embodiment 4 of the present disclosure.

FIG. 4 is a flowchart of a data processing method provided in Embodiment 4 of the present disclosure. On the basis of the foregoing embodiments, this embodiment further explains the determination of the target key value pair for processing data according to the data processing request, and the processing of the data in the value field of the target key value pair. As illustrated in FIG. 4, the method specifically includes the following steps.

At step S410, a data processing request is acquired.

At step S420, according to the data processing request, a current version identifier is determined.

At step S430, the operation mode of the target data specified in the data processing request is determined. When the data processing request is a writing operation on the target data, step S440 is executed; when the data processing request is a changing operation to change data of a value field of an existing key value pair to the target data, then step S450 is executed; when the data processing request is a deleting operation on the existing key value pair, step S460 is executed; and when the data processing request is a reading operation on the existing key value pair, step S470 is executed.

It should be noted that the operation mode in the data processing request on the target data involves at least one of a writing operation, a deleting operation, a reading operation, and a changing operation.

At step S440, a new key value pair is generated as the target key value pair, a new key identifier and the current version identifier are written into a key field of the target key value pair, the target data is written in a value field of the target key value pair, and step S480 is executed.

In this embodiment, the new key identifier refers to a key identifier that is different from the key identifier of the existing key value pair, that is, the key identifier that appears for the first time.

In particular, when the data processing request is a writing operation on the target data, the new key value pair is generated as the target key value pair, and the target data identifier, such as the block identifier or transaction identifier, is obtained from the data processing request as the new key identifier, the new key identifier and the current version identifier are written in the key field of the target key value pair, and the target data is written into the value field of the target key value pair.

For example, when a new account performs a money-transfer operation for the first time, the target data is the money-transfer transaction data (transferred amount), the key identifier is a account name, and the processing on the target data is to write the money-transfer transaction data into the value field of the key value pair.

At step S450, a new key value pair is generated as the target key value pair, the key identifier of the existing key value pair and the current version identifier are written into a key field of the target key value pair, the target data is written into a value field of the target key value pair, and step S480 is executed.

In particular, when the data processing request is a changing operation to change data of a value field of an existing key value pair to the target data, a new key value pair is generated as the target key value pair, and according to the key identifier and the previous version identifier of the target data in the data processing request, the existing key value pair where the target data is located is determined, then the key identifier of the existing key value pair is determined as the key identifier of the target key value pair, and the key identifier and the current version identifier are written into the key field of the target key value pair, and the target data is written into the value field of the target key value pair.

Alternatively, when the data processing request is to add or subtract the target data based on data of the value field of the existing key value pair, a new key value pair may be generated as the target key value pair, and according to the key identifier and the previous version identifier of the target data in the data processing request, it is determined that the existing key value pair where the target data is located. Then the key identifier of the existing key value pair is determined as the key identifier of the target key value pair, and the key identifier and the current version identifier are written into the key field of the target key value pair. Data of the value field of the existing key value pair is acquired, and the result of adding the target data to the data of value field or subtracting the target data from the data of value field is written into the value field of the target key value pair.

It should be noted that, in this embodiment, when it is determined that the data processing request is a changing of data of a value field of an existing key value pairs, a new KV is added to store the modified data. Compared with the changing on the original KV, the existing key-value pairs are retained, which is convenient for quickly switching to the key values of other previous versions to view the data based on the version identification.

At step S460, a new key value pair is generated as the target key value pair, the key identifier of the existing key value pair and the current version identifier are written in the key field of the target key value pair, the value field of the target key value pair is set as a null, and step S480 is executed.

In particular, when the data processing request is a deleting operation on the existing key value pair, a new key value pair is generated as the target key value pair, and according to the key identifier and version identifier of the target data in the data processing request, the existing key value pair where the target data is located is determined. Then the key identifier of the existing key value pair is determined as the key identifier of the target key value pair, and the key identifier and the current version identifier are written into the key field of the target key value pair, and the value field of the target key value pair is set as a null. The existing key value pairs are still retained, but as the upper software has learned that the key value pairs corresponding to the current version identifier are valid, the relevant data may be accessed based on the current version identifier, and the existing key value pairs may be relatively confirmed to be invalid, which are no longer accessed by the upper software, that is, a deleting operation is performed. However, when the upper software needs to reuse the existing key value pairs that have been confirmed to be invalid, the data control of the existing key value pairs may be restored only by modifying the version identifier used when accessing the data to restore.

At step S470, the existing key value pair is determined as the target key value pair, and data in a value field of the target key value pair is read and fed back, and step S480 is executed.

In particular, when the data processing request is a reading operation or querying operation on the existing key value pair, the existing key value pair is the target key value pair, and according to the key identifier and version identifier of the target key value pair in the data processing request, the storage address of the target key value pair is determined, then the target key value pair position is located according to the storage address, and data is read from the value field of the target key value pair, and fed back to the upper software.

At step S480, the newly generated target key value pair is written into a storage space, in which a key field of the target key value pair in the storage space stores a key identifier and a version identifier, and the version identifier in the key field of the newly generated target key value pair is the current version identifier.

In the technical solution according to the embodiments of this application, after determining the current version identifier according to the data processing request, and based on the data operation mode given in the data processing request, such as writing operation, reading operation, deleting operation or changing operation, the corresponding processing strategy is adopted to perform the data processing request, and the newly generated target key value pair in this process is written into a storage space to complete the data storage. In particular, when data needs to be written, modified or deleted, a new KV storage is added to write, change or delete data. Compared with performing the above operations in the original KV, the application retains the existing key value pairs, which is convenient for subsequent data view by quickly switching to the key field of other previous version identifiers based on the version identifier, thereby optimizing the indexing manner of the blockchain KV storage system, and providing a new idea for blockchain data storage.

Embodiment 5

Figure 5A:
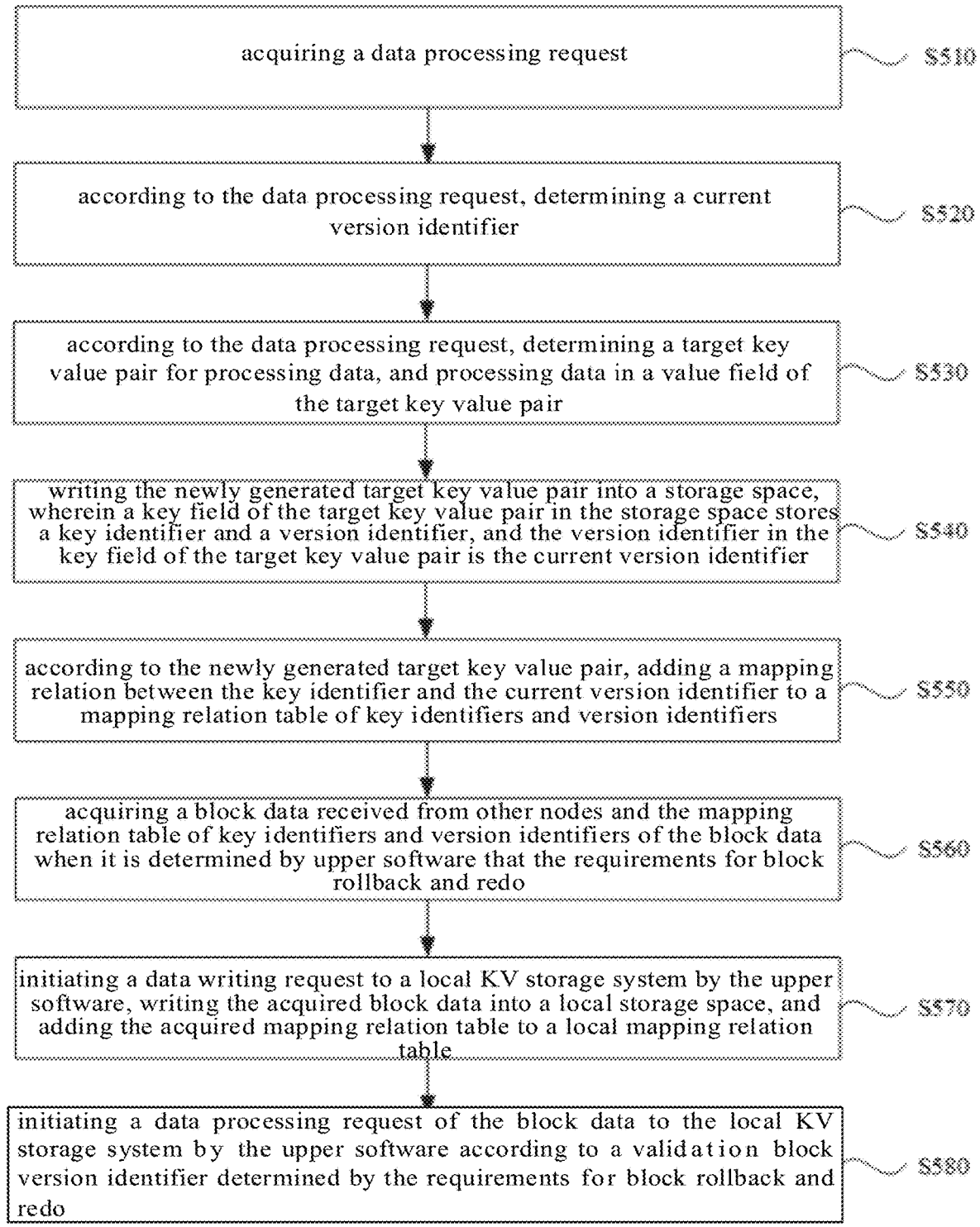
FIG. 5A is a flowchart of a data processing method provided in Embodiment 5 of the present disclosure.

FIG. 5A is a flowchart of a data processing method provided in Embodiment 5 of the present disclosure. On the basis of the above-mentioned embodiments, this embodiment provides a way for handling bifurcation situations when applied to a blockchain system, which effectively solves the problem that data rollback and redo are necessary to be performed during bifurcation. This method is applicable to blockchain nodes. As illustrated in FIG. 5A, the method specifically includes the following steps.

At step S510, a data processing request is acquired.

At step S520, according to the data processing request, a current version identifier is determined.

At step S530, according to the data processing request, a target key value pair for processing data is determined, and data in a value field of the target key value pair is processed.

At step S540, the newly generated target key value pair is written into a storage space, in which a key field of the target key value pair in the storage space stores a key identifier and a version identifier, and the version identifier in the key field of the newly generated target key value pair is the current version identifier.

At step S550, according to the newly generated target key value pair, a mapping relation between the key identifier and the current version identifier is added to a mapping relation table of key identifiers and version identifiers.

In this embodiment, the underlying storage system pre-establishes a mapping relation table of key identifiers and version identifiers for the upper software to query. Alternatively, the mapping relation table of key identifiers and version identifiers lists key identifiers of all key value pairs in the storage system. Each key identifier may correspond to one or more version identifiers, and the number of the version identifiers is increased with the updating of the key value pairs.

In particular, after the newly generated target key value pair is written into the storage space, the key identifier and the version identifier of the newly generated target key value pair may be correspondingly stored in the mapping relation table. In particular, the key identifier of the newly generated target key value pair is input into the mapping relation table of key identifiers and version identifiers for matching. If the matching is successful, then the key identifier of the target key value pair has been stored, and the version identifier associated with the key identifier is added at the corresponding position of the key identifier in the mapping relation table. If the matching fails, it means that the key identifier of the target key value pair has not been stored, and a new index pair of the key identifier and the version identifier is added to the mapping relation table. For example, during the processing of different blocks, multiple money-transfer operations may occur for the same account, and the account balance has changed for multiple times. Then the key value pair used to store the account balance may have a plurality of different version identifiers.

In order to facilitate quick query and statistics for the upper software to locate the changed key identifier corresponding to the version identifier (that is, after the value associated with the key identifier is changed), the underlying storage system may construct a reverse index table of version identifiers and key identifiers, that is, one version identifier corresponds to a plurality of key identifiers. Based on the version identifier, the changed key identifier corresponding to the version identifier may be quickly acquired. For example, during the processing of a certain block which involves in updating 10 key value pairs, key identifiers are recorded for the version identifier where the value fields of the 10 key value pairs are changed. For example, the process of writing the newly generated target key value pair into the storage space may also include: in the reverse index of version identifiers and key identifiers, adding the key identifier of the newly generated target key value pair corresponding to the current version identifier.

At step S560, when it is determined by upper software that the requirements for block rollback and redo are generated, a block data received from other nodes and the mapping relation table of key identifiers and version identifiers of the block data are acquired.

Figure 5B:
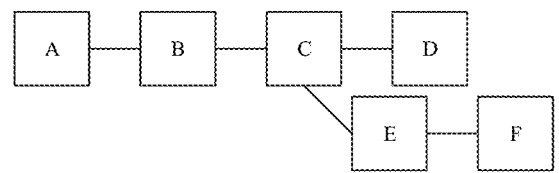
FIG. 5B is a schematic diagram of a blockchain bifurcation provided in Embodiment 5 of the present disclosure.

In this embodiment, the requirements for block rollback and redo may be that, when bifurcation occurs on the blockchain, it is determined by the upper software that the blockchain data stored locally on the blockchain node needs to be rolled back and redo. The bifurcation may occur when in a blockchain stored locally on a blockchain node, the last few blocks do not match with the blocks generated by other nodes, it is necessary to accept the blocks of other nodes while discard the local blocks. As illustrated in FIG. 5B, the block chain stored locally on a blockchain node includes four blocks A, B, C, and D. Through a consensus mechanism, it is determined that the block D needs to be discarded, and the two blocks E and F provided by other nodes should be accepted. In other words, the block D needs to be rolled back, and the blocks E and F need to be redone based on the block data obtained from other nodes.

In particular, when the requirements for block rollback and redo are determined based on the upper software, the blockchain node may send a block data acquiring request to other nodes, to request other nodes to feed back the required block data and a mapping relation table of key identifiers and version identifiers of the block data. The blockchain node receives the block data fed back by other nodes, and the mapping relation table of key identifiers and version identifiers of the block data.

At step S570, the upper software initiates a data writing request to the local KV storage system, writes the acquired block data into the local storage space, and adds the acquired mapping relation table to a local mapping relation table.

In this embodiment, the local KV storage system is a local underlying storage system of the blockchain node. The data writing request refers to a request sent by the blockchain node to the local KV storage system based on the upper software to request the local KV storage system to write data into its storage space.

In particular, the blockchain node may add the mapping relation table of key identifiers and version identifiers of the block data fed back by other nodes into the local mapping relation table. The version identifiers and key identifiers in the local mapping relation table do not need to be deleted, but the new content obtained from the mapping relation table is added into the local mapping relation table.

The upper software may initiate a data writing request to the local KV storage system to request the local KV storage system to write the block data into the local storage space.

The block data and mapping relation table sent by other blockchain nodes may include the total data, or may only include the block data that needs to be redone, for example, the block data and version identifier involved in the blocks E and F.

It should be noted that, as the key value pairs stored in the local KV storage system have a spatial association relation, the index of a large number of the stored key value pairs needs to be adjusted when changing some key value pair. In order to reduce the resource expenditure and workload caused by adjusting the index of a large number of the stored key value pairs by the local KV storage system, the correct index may be added without modifying the wrong index. For example, adding the acquired mapping relation table to the local mapping relation table may include: adding an incremental key identifier and an incremental version identifier of the acquired mapping relation table relative to the local mapping relation table, to the local mapping relation table, and retaining existing key identifiers and version identifiers of the local mapping relation table, in which the incremental version identifier includes a validation block version identifier, and the existing version identifiers of the local mapping relation table include invalidation block version identifiers.

In this embodiment, in the local mapping relation table of the blockchain node, the block version identifier associated with the block that needs to be rolled back is the invalidation block version identifier. Correspondingly, the block version identifier associated with the required block obtained from other nodes is the validation block version identifier. In particular, when key identifiers and version identifiers of the local mapping relation table are retained, the blockchain node adds the validation block version identifiers and version identifiers of the mapping relation table obtained from other nodes relative to the local mapping relation table to the local mapping relation table.

It should be noted that in this embodiment, when the requirements for block rollback and redo are determined by the upper software, the block rollback and redo operations are not actually performed, but based on the mapping relation table of key identifiers and version identifiers maintained by the nodes, the block data and version identifier provided by other nodes are directly stored.

At step S580, the upper software initiates a block data processing request to the local KV storage system according to a validation block version identifier determined by the requirements for block rollback and redo.

In particular, after step S570 is executed, the upper software may initiate data processing request such as a querying, deleting, changing or writing operation on block data to the local KV storage system according to the validation block identifier and version identifier determined by the requirements for block rollback and redo, that is, the local KV storage system executes the operations from step S510 to step S550.

It should be noted that the operation process from step S560 to step S580 does not need to be executed after step S550, as long as the local KV storage system has provided its upper software with a mapping relation table of key identifiers and version identifiers. The process may be executed after or before any one of the steps S510 to S550.

In the technical solution according to the embodiments of the present disclosure, when the requirements for block rollback and redo are determined by the upper software, block data may be received from other nodes, and the mapping relation table of key identifiers and version identifiers of the block data may be received. Then, the upper software initiates a data writing request to the local KV storage system for requesting the local KV storage system to write the block data into the local storage space. Meanwhile, the acquired mapping relation table may be added to the local mapping relation table, then the adjustment of the bifurcation block may be completed. Compared with the existing methods of rollback and redo, this solution does not actually perform block rollback and redo operations. The block rollback and redo of the blockchain nodes may be solved only based on the mapping relation table of key identifiers and version identifiers maintained by the node. The indexing manner of the blockchain KV storage system is optimized, the amount of data occupied by the index is reduced, and a new idea is provided for block rollback and redo.

In the foregoing examples, the blockchain node directly receives the data involved in the execution of the blocks E and F from other nodes, including the transaction data in the block as well as the modified data after the execution of the transaction request, wherein the data involved in the execution of the block all have the same version identifier. Therefore, as long as the upper software determines that the version identifiers of the blocks E and F is valid and the version identifier of the block D is invalid, then the blockchain node in the subsequent processing only processes the data corresponding to the valid block and does not process the data corresponding to invalid blocks. However, the data corresponding to the invalid block is not deleted from the storage space. In the above operation process, there is no need to roll back the transaction request of the invalid block for eliminating the impact on the stored data, and there is no need to redo the transaction request of the valid block for acquiring new data.

In addition, it should be noted that if a plurality of transaction requests are involved in the same block, the same target key value pair needs to be operated on. The version identifier of the target key value pair may be modified when the first transaction request is executed. When other transaction requests are subsequently executed, only data of the value field of the target key value pair is modified without modifying the version identifier. For example, during the processing in one block, a transaction request is to transfer money form the account A to the account B, and another transaction request is to transfer money form the account A to the account C. The version identifier of the target key value pair corresponding to the account A is determined as the current version identifier after the money-transfer from the account A to the account B is completed. After performing the money-transfer from the account A to the account C, the version identifier of the target key value pair corresponding to the account A is still the current version identifier without a new generated key value pair. Since the operations on the same target key value pair are all in the same block, solving the problem of block rollback based on version identifiers is not affected.

Embodiment 6

Figure 6:
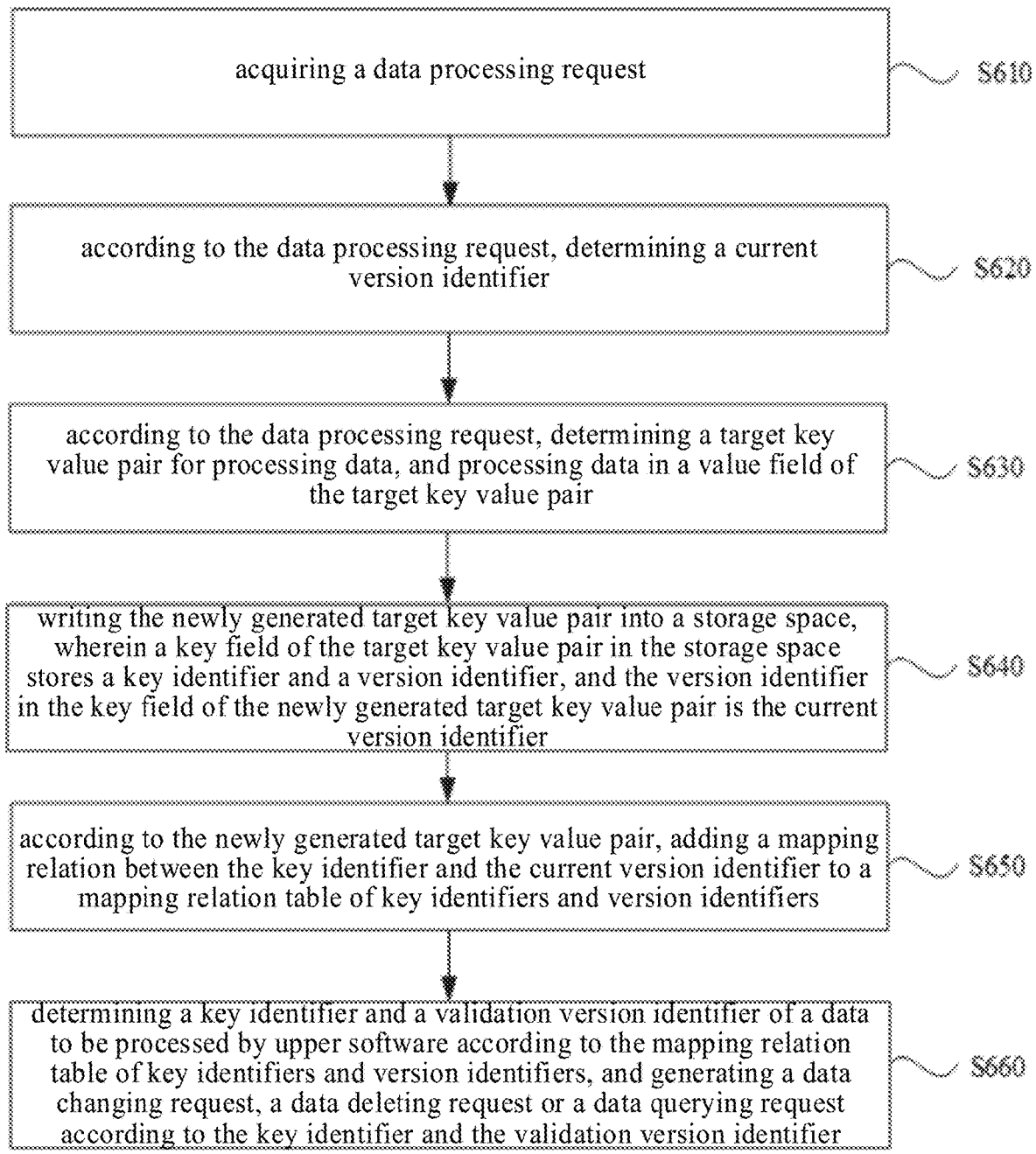
FIG. 6 is a flowchart of a data processing method provided in Embodiment 6 of the present disclosure.

FIG. 6 is a flowchart of a data processing method provided in Embodiment 6 of the present disclosure. On the basis of the above-mentioned embodiments, this embodiment is further optimized. As illustrated in FIG. 6, the method specifically includes the following steps.

At step S610, a data processing request is obtained.

At step S620, according to the data processing request, a current version identifier is determined.

At step S630, according to the data processing request, a target key value pair for processing data is determined, and data in a value field of the target key value pair is processed.

At step S640, the newly generated target key value pair is written into a storage space, in which a key field of the target key value pair in the storage space stores a key identifier and a version identifier, and the version identifier in the key field of the newly generated target key value pair is the current version identifier.

At step S650, according to the newly generated target key value pair, a mapping relation between the key identifier and the current version identifier is added to a mapping relation table of key identifiers and version identifiers.

At step S660, the upper software determines a key identifier and a validation version identifier of a data to be processed according to the mapping relation table of key identifiers and version identifiers, and a data changing request, a data deleting request or a data querying request is generated according to the key identifier and the validation version identifier.

In particular, the local KV storage system provides the upper software with a mapping relation table of key identifiers and version identifiers. When a blockchain node needs to query, delete or change certain data, the upper software may determine the key identifier and the validation version identifier of the data to be processed according to the mapping relation table of key identifiers and version identifiers. A data changing request, a data deleting request or a data querying request is generated according to the key identifier and the validation version identifier and sent to the local KV storage system by the upper software, so that the local KV storage system executes the operations from step S610 to step S650, and the corresponding results are fed back to the blockchain node through the local KV storage system, such as feeding back the read data.

It should be noted that the operation process of step S660 does not need to be executed after step S650, as long as the local KV storage system has provided the upper software with a mapping relation table of key identifiers and version identifiers, that is, the process may also be executed after or before any one of steps S610 to S650.

In the case that the local KV storage system has provided the upper software with the mapping relation table of key identifiers and version identifiers, for example, the method may also include: generating a data writing request by upper software when new business data is written, determining a version identifier of the previous business data as a previous version identifier on which the data writing request depends, in which the previous version identifier is carried in the data writing request; wherein the new business data is a new block data or a new transaction data.

In particular, when the blockchain node needs the local KV storage system to store data, the version identifier of the previous business data is determined by the upper software based on the mapping relation table of key identifiers and version identifiers. This version identifier is determined as a previous version identifier on which the data writing request depends. Then, a data writing request is generated according to the previous version identifier, the new business data, and the new business data identifier, and this request is sent to the local KV storage system by the upper software, so that the local KV storage system executes the operations from step S610 to step S640 to complete the writing of the new business data, and step S650 is executed to update the mapping relation table of key identifiers and version identifiers, meanwhile the updated mapping relation table of key identifiers and version identifiers is fed back to the upper software.

In the technical solution according to the embodiments of this disclosure, when a blockchain node needs to query, delete or change certain data, the upper software may determine the key identifier and the validation version identifier of the data to be processed according to the mapping relation table of key identifiers and version identifiers. A data changing request, data deleting request or data querying request is generated according to the key identifier and the validation version identifier, and sent to the local KV storage system by the upper software, so that the local KV storage system executes the operations of writing data or key value pair to the storage space.

Embodiment 7

Figure 7:
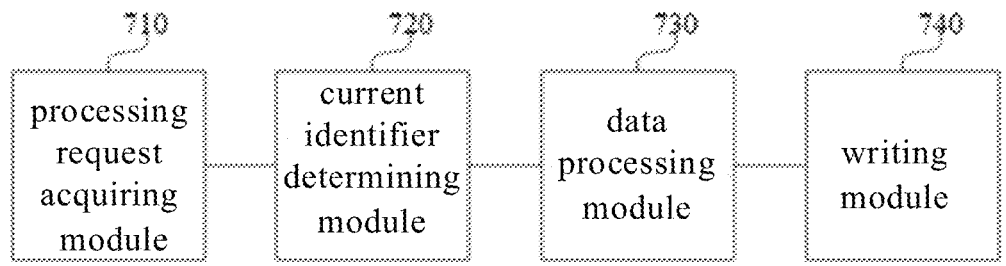
FIG. 7 is a schematic diagram of a data processing apparatus provided in Embodiment 7 of the present disclosure.

FIG. 7 is a schematic diagram of a data processing apparatus provided in Embodiment 7 of the present disclosure. The apparatus may be configured in a computing device, especially in a computing device as a blockchain node, may execute the data processing method according to any embodiment of the present disclosure, and may have the corresponding functional modules and beneficial effects of the execution method. As illustrated in FIG. 7, the apparatus includes: a processing request acquiring module 710, a current identifier determining module 720, a data processing module 730, and a writing module 740.

The processing request acquiring module 710 is configured to acquire a data processing request.

The current identifier determining module 720 is configured to determine a current version identifier, according to the data processing request.

The data processing module 730 is configured to, according to the data processing request, determine a target key value pair for processing data, and process data in a value field of the target key value pair.

The writing module 740 is configured to write the newly generated target key value pair into a storage space, in which a key field of the target key value pair in the storage space stores a key identifier and a version identifier, and the version identifier in the key field of the newly generated target key value pair is the current version identifier.

The technical solution according to the embodiments of this application determines the current version identifier and the target key value pair for processing the data through a data processing request, and performs the processes for example, writing, changing, deleting or reading the data in the value field of the target key value pair. When the target key value pair is the newly generated target key value pair, the current version identifier is stored in the key field of the target key value pair, then the newly generated target key value pair is written into the storage space, the storage of the data is thus completed. In this solution, when data needs to be written, modified, or deleted, the existing key value pairs are retained, and operations are performed in the newly generated key value pairs, which is convenient for data view by quickly switching to the keys of other previous version identifiers based on the version identifiers and further optimizes the indexing manner of the blockchain KV storage system. In particular, since the blockchain system has the requirements for block rollback and redo, for example, the rollback is required when bifurcation occurs, the KV storage system according to the embodiments of this application may easily switch to the key value pair data of any previous version without the data recovery of a large number of key value pairs. Compared with the data storage method of the existing blockchain, the version recovery speed is improved, and a new idea is provided for the data storage of the blockchain.

For example, the current identifier determining module 720 is configured to:

determine a data object of a previous version according to the data processing request; and generate a data object of the current version, and determine the current version identifier based on the data object of the previous version, in which a storage space of the data object of the current version is identical to a storage space of the data object of the previous version.

For example, when the target key value pair for processing data is determined according to the data processing request, the data processing module 730 is further configured to:

according to the key identifier and the version identifier of a target data in the data processing request, determine an existing key value pair where the target data is located as the target key value pair.

For example, the data processing module 730 is further configured to:

when the data processing request is a writing operation on a target data, generate a new key value pair as the target key value pair, write a new key identifier and the current version identifier into a key field of the target key value pair, and write the target data into a value field of the target key value pair;

when the data processing request is a changing operation to change data of a value field of an existing key value pair to the target data, generate a new key value pair as the target key value pair, write a key identifier of the existing key value pair and the current version identifier into a key field of the target key value pair, and write the target data into a value field of the target key value pair;

when the data processing request is a deleting operation on an existing key value pair, generate a new key value pair as the target key value pair, write a key identifier of the existing key value pair and the current version identifier into a key field of the target key value pair, and set a value field of the target key value pair as a null; and when the data processing request is a reading operation on an existing key value pair, determine the existing key value pair as the target key value pair, read and feed-back data in a value field of the target key value pair.

For example, the data processing module 730 is further configured to:

in a data object of the current version, call a function corresponding to a data operation according to the data processing request, and determine the current version identifier of the data object of the current version as an input parameter of the function to execute the data processing request.

For example, the current identifier determining module 720 may include:

a previous version identifier determining unit, configured to determine a previous version identifier;

a current version identifier determining unit, configured to determine the current version identifier according to a preset numbering rule; or the current version identifier determining unit is configured to determine a previous version identifier, generate a serial number identifier of the current version identifier based on a serial number identifier of the previous version identifier according to the preset numbering rule, and form the current version identifier by combining a additional version identifier determined according to the data processing request with the serial number identifier.

For example, the previous version identifier determining unit is configured to:

extract the previous version identifier from the data processing request; or determine the previous version identifier according to a business data identifier in the data processing request, in which the business data identifier is a block identifier or a transaction identifier.

For example, the additional version identifier is a block identifier or a transaction identifier.

For example, the writing module 740 may include:

a validation instruction calling unit, configured to call a validation control instruction to validate the data object of the current version; and a writing unit, configured to write the newly generated target key value pair in the data object of the current version into the storage space.

For example, the above apparatus may further include:

an invalidation instruction calling module, configured to call an invalidation control instruction to invalidate the data object of the current version, before writing the newly generated target key value pair into the storage space.

For example, the apparatus further includes a changing and updating unit, configured to modify the current version identifier according to a version identifier modification instruction transmitted by upper software, and update the current version identifier in the key field of the key value pair.

For example, the validation instruction calling unit is configured to when a current version validation condition is generated or a current version validation instruction sent by upper software is received, call the validation control instruction.

For example, the generated current version validation condition includes at least one of the following:

a block identifier of a data to be processed has changed; and a transaction identifier of the data to be processed has changed.

For example, the invalidation instruction calling unit is further configured to:

when a current version invalidation condition is generated, or a current version invalidation instruction sent by upper software is received, call the invalidation control instruction.

For example, the apparatus may further include:

an adding module, configured to according to the newly generated target key value pair, add a mapping relation between the key identifier and the current version identifier to a mapping relation table of key identifiers and version identifiers.

For example, the apparatus may further include: a rollback and redo module configured to:

acquire a block data received from other nodes and a mapping relation table of key identifiers and version identifiers of the block data when it is determined by upper software that requirements for block rollback and redo;

initiate a data writing request to a local KV storage system by the upper software, writing the acquired block data into a local storage space, and add the acquired mapping relation table to a local mapping relation table; and initiate a data processing request of the block data to a local KV storage system by the upper software according to a validation block version identifier determined by the requirements for block rollback and redo.

For example, when the acquired mapping relation table is added to the local mapping relation table, the rollback and redo module is further configured to:

add an incremental key identifier and an incremental version identifier of the acquired mapping relation table relative to the local mapping relation table, to the local mapping relation table, and retain existing key identifiers and version identifiers of the local mapping relation table, in which and the incremental version identifier includes a validation block version identifier, and the existing version identifiers of the local mapping relation table include invalidation block version identifiers.

For example, the apparatus may further include a request generating module, configured to determine a key identifier and a validation version identifier of data to be processed by upper software according to the mapping relation table of key identifiers and version identifiers, and generate a data changing request, a data deleting request or a data querying request according to the key identifier and the validation version identifier.

For example, the request generating module is further configured to:

generate a data writing request by upper software when a new business data is written, determine a version identifier of the previous business data as a previous version identifier on which the data writing request depends, in which the previous version identifier is carried in the data writing request. The new business data is a new block data or a new transaction data.

For example, the storage space is a disk storage space, and an index used by the KV storage system in the disk storage space is an ordered table or an index tree.

For example, the apparatus may further include:

an adding module, configured to, when the newly generated target key value pair is written into the storage space, in a reverse index of version identifiers and key identifiers, add a key identifier of the newly generated target key value pair corresponding to the current version identifier.

Embodiment 8

Figure 8:
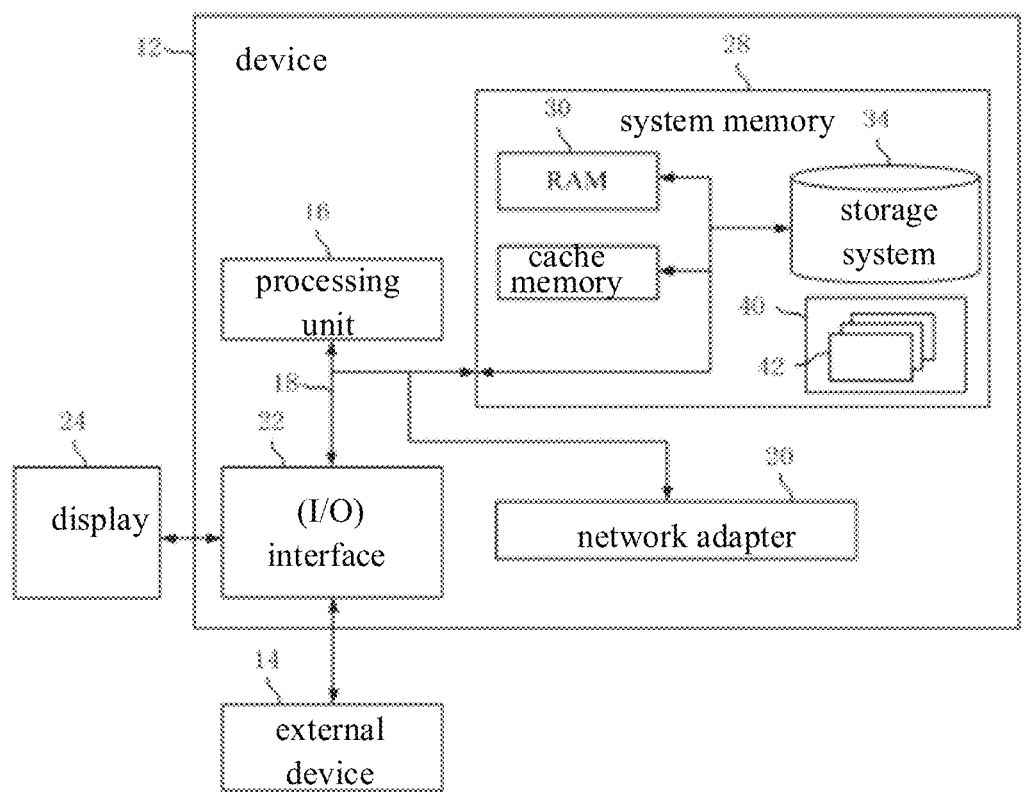
FIG. 8 is a schematic diagram of a device provided in Embodiment 8 of the present disclosure.

FIG. 8 is a schematic diagram of a device provided in Embodiment 8 of the present disclosure. FIG. 8 is a block diagram of an exemplary device 12 applicable for implementing embodiments of the present disclosure. The device 12 shown in FIG. 8 is only an example, which should not bring any limitation to the function and scope of the embodiments of the present disclosure. Typically, the device 12 may be a computing device or a computing device that undertakes the function of a blockchain network node.

As illustrated in FIG. 8, the device 12 is represented in a form of a general-purpose computing device. The components of the electronic device 12 may include, but are not limited to, one or more processors or processing units 16, a system memory 28, and a bus 18 connecting different system components (including the system memory 28 and the processing unit 16).

The bus 18 represents one or more of several types of bus structures, including a memory bus or a memory controller, a peripheral bus, an accelerated graphics port, and a processor or a local bus with any of a variety of bus structures. For example, these architectures include but not limited to an ISA (Industry Standard Architecture) bus, a MAC (Micro Channel Architecture) bus, an enhanced ISA bus, a VESA (Video Electronics Standards Association) local bus and a PCI (Peripheral Component Interconnection) bus.

The electronic device 12 typically includes a variety of computer system readable media. These media may be any available media that may be accessed by the device 12, including volatile and non-volatile media, removable and non-removable media.

The system memory 28 may include a computer system readable medium in the form of volatile medium, such as a RAM (Random Access Memory) 30 and/or a cache memory 32. The device 12 may further include other removable/non-removable, volatile/non-volatile computer system storage media. Only as an example, the storage system 34 may be configured to read from and write into non-removable, non-volatile magnetic media (not illustrated in FIG. 8, and usually called "a hard disk driver"). Although not illustrated in FIG. 8, a magnetic disk driver configured to read from and write into a removable and non-volatile magnetic disc (such as "a floppy disk"), and an optical disc driver configured to read from and write into a removable and non-volatile optical disc (such as a CD-ROM, a DVD-ROM or other optical media) may be provided. Under these circumstances, each driver may be connected to the bus 18 by one or more data media interfaces. The system memory 28 may include at least one program product. The program product has a set of program modules (for example, at least one program module), and these program modules are configured to perform the functions of each embodiment of the present disclosure.

A program/utility tool 40, having a set (at least one) of program modules 42, may be stored in, for example, the system memory 28. Such program modules 42 include but not limited to an operating system, one or more application programs, other program modules, and program data. Each or some combination of these examples may include an implementation of a network environment. The program modules 42 usually execute functions and/or methods in embodiments described in the present disclosure.

The device 12 may communicate with one or more external devices 14 (such as a keyboard, a pointing device, and a display 24), and may further communicate with one or more devices enabling a user to interact with the device 12, and/or may communicate with any device (such as a network card, and a modem) enabling the device 12 to communicate with one or more other computer devices. Such communication may be performed via an Input/Output (I/O) interface 22. Moreover, the device 12 may further communicate with one or more networks (such as LAN (Local Area Network), WAN (Wide Area Network) and/or public network, such as Internet) via a network adapter 20. As illustrated, the network adapter 20 communicates with other modules of the device 12 via the bus 18. It should be understood that, although not illustrated, other hardware and/or software modules may be used in combination with the device 12, including but not limited to: microcode, device drivers, redundant processing units, external disk drive arrays, RAID (Redundant Array of Independent Disks) systems, tape drives, and data backup storage systems, etc.

The processing unit 16, by operating programs stored in the system memory 28, executes various function applications and data processing, for example implements the data processing method provided in embodiments of the present disclosure.

Embodiment 9

Embodiment 9 of the present disclosure also provides a computer-readable storage medium on which a computer program is stored. When the program is executed by a processor, the data processing method described in the foregoing embodiments may be implemented. The computer-readable storage medium is configured on a computing device or on a blockchain node.

The computer storage media in the embodiments of the present disclosure may adopt any combination of one or more computer-readable media. The computer-readable medium may be a computer-readable signal medium or a computer-readable storage medium. A computer-readable medium may be, for example, but is not limited to, an electronic, magnetic, optical, electromagnetic, infrared, or semiconductor system, apparatus, or device, or any combination of the above. More specific examples (non-exhaustive list) of computer-readable storage media include: electrical connections with one or more wires, portable computer disks, hard disks, random access memories (RAM), read-only memories (ROM), erasable programmable read-only memories (EPROM or flash memory), optical fiber, portable compact disc read-only memories (CD-ROM), optical storage devices, magnetic storage devices, or any suitable combination of the above. In the present disclosure, a computer-readable storage medium may be any tangible medium that contains or stores a program that can be used by or in combination with an instruction execution system, apparatus, or device.

A computer-readable signal medium may include a data signal that is propagated in a baseband or as part of a carrier wave, carrying computer readable program codes therein. The data signal propagated in this manner may take a plurality of forms including, but not limited to, an electromagnetic signal, an optical signal, or any suitable combination thereof. The computer-readable signal medium may also be any computer-readable medium other than a computer-readable storage medium. The computer-readable medium may send, propagate, or transmit a program for use by or in connection with an instruction execution system, apparatus, or device.

Program codes contained in the computer-readable medium may be transmitted over any suitable medium, including but not limited to a wireless connection, a wired connection, a fiber optic cable, RF, or any suitable combination of the above.

Computer program codes for performing the operations of the present disclosure may be written in one or more programming languages, or a combination thereof, including an object-oriented programming language such as Java, Smalltalk, C++, and a conventional procedural programming language such as "C" language or the like. The program codes may be entirely executed on the user's computer, partly executed on the user's computer, executed as a stand-alone software package, partly executed on the user's computer and partly executed on a remote computer, or entirely executed on the remote computer or server. In the case of a remote computer, the remote computer may be connected to the user's computer via any kind of network, including a local area network (LAN) or wide area network (WAN), or it may be connected to an external computer (such as via Internet connection provided by an Internet service provider).

It is noted that although the application has been described in detail through the above embodiments, the application is not limited to the above embodiments, and can also include more other equivalent embodiments without departing from the concept of the application. The scope of the application is determined by the scope of the appended claims.

What is claimed is:

1. A data processing method, performed by a blockchain node, comprising:
in response to upper software determining that requirements for block rollback and redo are generated, acquiring block data received from other nodes and a mapping relation table of key identifiers and version identifiers of the block data;
initiating a data writing request to a local key value (KV) storage system by the upper software, writing the acquired block data into a local storage space, and adding the acquired mapping relation table of the block data to a local mapping relation table;
initiating a data processing request of the block data to the local KV storage system by the upper software according to a validation block version identifier determined by the requirements for block rollback and redo;
according to the data processing request, determining a current version identifier;
according to the data processing request, determining a target key value pair for processing data, and processing data in a value field of the target key value pair to generate a new target key value pair;
writing the newly generated target key value pair into a storage space, wherein a key field of a key value pair in the storage space stores a key identifier and a version identifier, and a version identifier in a key field of the newly generated target key value pair is the current version identifier; and according to the newly generated target key value pair, adding a mapping relation between the key identifier and the current version identifier to a mapping relation table of key identifiers and version identifiers.

2. The method according to claim 1, wherein determining the current version identifier according to the data processing request comprises:
determining a data object of a previous version according to the data processing request; and
determining the current version identifier and generating a data object of the current version based on the data object of the previous version, wherein a storage space of the data object of the current version is identical to a storage space of the data object of the previous version.

3. The method according to claim 2, wherein, according to the data processing request, determining the target key value pair for processing data comprises:
according to a key identifier and a version identifier of target data in the data processing request, determining an existing key value pair where the target data is located as the target key value pair.

4. The method according to claim 3, wherein, according to the data processing request, determining the target key value pair for processing data, and processing the data in the value field of the target key value pair comprises:
calling a function corresponding to a data operation according to the data processing request, and determining the current version identifier of the data object of the current version as an input parameter of the function to execute the data processing request.

5. The method according to claim 2, wherein writing the newly generated target key value pair into the storage space comprises:
calling a validation control instruction to validate the data object of the current version, and writing the newly generated target key value pair in the data object of the current version into the storage space.

6. The method according to claim 5, wherein before invalidating the data object of the current version, the method further comprises:
modifying the current version identifier according to a version identifier modification instruction transmitted by upper software, and updating the current version identifier in the key field of the key value pair.

7. The method according to claim 5, wherein calling the validation control instruction comprises:
in response to generating a current version validation condition or in response to receiving a current version validation instruction sent by upper software, calling the validation control instruction;
wherein the current version validation condition generated comprises at least one of the followings:
a block identifier of data to be processed has changed; and
a transaction identifier of the data to be processed has changed.

8. The method according to claim 2, wherein before writing the newly generated target key value pair into the storage space, the method further comprises:
calling an invalidation control instruction to invalidate the data object of the current version.

9. The method according to claim 8, wherein calling the invalidation control instruction comprises:
in response to generating a current version invalidation condition, or in response to receiving a current version invalidation instruction sent by upper software, calling the invalidation control instruction.

10. The method according to claim 1, wherein, according to the data processing request, determining the target key value pair for processing data, and processing the data in the value field of the target key value pair comprises:
in response to the data processing request being a writing operation on target data, generating a new key value pair as the target key value pair, writing a new key identifier and the current version identifier into a key field of the target key value pair, and writing the target data into a value field of the target key value pair;
in response to the data processing request being a changing operation to change data of a value field of an existing key value pair to target data, generating the new key value pair as the target key value pair, writing a key identifier of the existing key value pair and the current version identifier into a key field of the target key value pair, and writing the target data into a value field of the target key value pair;
in response to the data processing request being a deleting operation on an existing key value pair, generating a new key value pair as the target key value pair, writing a key identifier of the existing key value pair and the current version identifier into a key field of the target key value pair, and setting a value filed of the target key value pair as a null; and
in response to the data processing request being a reading operation on an existing key value pair, determining the existing key value pair as the target key value pair, reading and feed-backing data in a value field of the target key value pair.

11. The method according to claim 1, wherein determining the current version identifier according to the data processing request comprises:
extracting a previous version identifier from the data processing request, or determining the previous version identifier according to a business data identifier in the data processing request, wherein the business data identifier is a block identifier or a transaction identifier, and generating the current version identifier according to a preset numbering rule and the previous version identifier; or
extracting a previous version identifier from the data processing request, or determining the previous version identifier according to a business data identifier in the data processing request, wherein the business data identifier is a block identifier or a transaction identifier, generating a serial number identifier of the current version identifier based on a serial number identifier of the previous version identifier according to a preset numbering rule, and forming the current version identifier by combining an additional version identifier determined according to the data processing request with the serial number identifier of the current version identifier.

12. The method according to claim 11, wherein the additional version identifier is a block identifier or a transaction identifier.

13. The method according to claim 1, wherein adding the acquired mapping relation table of the block data to the local mapping relation table comprises:
adding, an incremental key identifier and an incremental version identifier of the acquired mapping relation table relative to the local mapping relation table, to the local mapping relation table, and retaining existing key identifiers and version identifiers of the local mapping relation table, wherein the incremental version identifier comprises a validation block version identifier, and the existing version identifiers of the local mapping relation table comprise invalidation block version identifiers.

14. The method according to claim 1, further comprising:
determining a key identifier and a validation version identifier of data to be processed by upper software according to the mapping relation table of the key identifiers and the version identifiers, and generating a data changing request, a data deleting request or a data querying request according to the key identifier and the validation version identifier.

15. The method according to claim 1, further comprising:
generating a data writing request by upper software in response to writing a new business data, determining a version identifier of previous business data as a previous version identifier on which the data writing request depends, wherein the previous version identifier is carried in the data writing request;
wherein the new business data is new block data or new transaction data.

16. The method according to claim 1, wherein the storage space is a disk storage space, and an index used by a key value (KV) storage system in the disk storage space is an ordered table or an index tree.

17. The method according to claim 1, wherein writing the newly generated target key value pair into the storage space further comprises:
in a reverse index of version identifiers and key identifiers, adding a key identifier of the newly generated target key value pair corresponding to the current version identifier.

18. A computing device, comprising:
one or more processors;
a storage device configured to store one or more programs;
when the one or more programs are executed by the one or more processors, the one or more processors are caused to implement the data processing method, comprising:
in response to upper software determining that requirements for block rollback and redo are generated, acquiring block data received from other nodes and a mapping relation table of key identifiers and version identifiers of the block data;
initiating a data writing request to a local key value (KV) storage system by the upper software, writing the acquired block data into a local storage space, and adding the acquired mapping relation table of the block data to a local mapping relation table;
initiating a data processing request of the block data to the local KV storage system by the upper software according to a validation block version identifier determined by the requirements for block rollback and redo;
according to the data processing request, determining a current version identifier;
according to the data processing request, determining a target key value pair for processing data, and processing data in a value field of the target key value pair to generate a new target key value pair;
writing a newly generated target key value pair into a storage space, wherein a key field of a key value pair in the storage space stores a key identifier and a version identifier, and a version identifier in a key field of the newly generated target key value pair is the current version identifier; and
according to the newly generated target key value pair, adding a mapping relation between the key identifier and the current version identifier to a mapping relation table of key identifiers and version identifiers.

19. A non-transitory computer-readable storage medium on which a computer program is stored, wherein the program when executed by a processor, implements the data processing method, comprising:
in response to upper software determining that requirements for block rollback and redo are generated, acquiring block data received from other nodes and a mapping relation table of key identifiers and version identifiers of the block data;
initiating a data writing request to a local key value (KV) storage system by the upper software, writing the acquired block data into a local storage space, and adding the acquired mapping relation table of the block data to a local mapping relation table;
initiating a data processing request of the block data to the local KV storage system by the upper software according to a validation block version identifier determined by the requirements for block rollback and redo;
according to the data processing request, determining a current version identifier;
according to the data processing request, determining a target key value pair for processing data, and processing data in a value field of the target key value pair to generate a new target key value pair; and
writing a newly generated target key value pair into a storage space, wherein a key field of a key value pair in the storage space stores a key identifier and a version identifier, and a version identifier in a key field of the newly generated target key value pair is the current version identifier; and
according to the newly generated target key value pair, adding a mapping relation between the key identifier and the current version identifier to a mapping relation table of key identifiers and version identifiers.

* * * * *